US009717260B2

(12) United States Patent
Diggs et al.

(10) Patent No.: US 9,717,260 B2
(45) Date of Patent: Aug. 1, 2017

(54) VEGETABLE FERMENTING KITCHENWARE

(71) Applicants: Karen Wang Diggs, San Francisco, CA (US); Eric A. Klein, San Francisco, CA (US)

(72) Inventors: Karen Wang Diggs, San Francisco, CA (US); Eric A. Klein, San Francisco, CA (US)

( * ) Notice: Subject to any disclaimer, the term of this patent is extended or adjusted under 35 U.S.C. 154(b) by 895 days.

(21) Appl. No.: 14/070,370

(22) Filed: Nov. 1, 2013

(65) Prior Publication Data
US 2014/0116271 A1 May 1, 2014

Related U.S. Application Data

(60) Provisional application No. 61/796,028, filed on Nov. 1, 2012.

(51) Int. Cl.
*A23B 7/10* (2006.01)
*C12C 3/00* (2006.01)
*B65D 51/28* (2006.01)

(52) U.S. Cl.
CPC .......... *A23B 7/105* (2013.01); *B65D 51/2892* (2013.01); *C12C 9/00* (2013.01)

(58) Field of Classification Search
CPC ....... A23D 7/105; B65D 51/2892; C12C 9/00
USPC .................. 99/527, 536, 297, 299
See application file for complete search history.

(56) References Cited

U.S. PATENT DOCUMENTS

| 2,694,691 | A | | 11/1954 | Atwood et al. |
| 4,287,819 | A | * | 9/1981 | Emerit ............ A61B 5/150389 |
| | | | | 116/DIG. 9 |
| 4,293,655 | A | | 10/1981 | Christ et al. |
| 4,877,624 | A | * | 10/1989 | Floyd ........................ A23L 3/10 |
| | | | | 137/522 |
| 5,461,968 | A | * | 10/1995 | Portman ................. A47J 31/20 |
| | | | | 99/287 |
| 2003/0066638 | A1 | | 4/2003 | Qu et al. |
| 2003/0136791 | A1 | * | 7/2003 | Tarlow ..................... A23G 9/28 |
| | | | | 99/472 |

FOREIGN PATENT DOCUMENTS

| CN | 1411748 | 4/2003 |
| WO | WO 9306747 | 4/1993 |

* cited by examiner

Primary Examiner — Omar Flores Sanchez
(74) Attorney, Agent, or Firm — Thomas M. Freiburger

(57) ABSTRACT

A kitchenware apparatus and container for producing fermented vegetables, such as sauerkraut, comprising a screw top or Mason jar, a threaded jar lid with moat and an oblong top slot opening, an inverted cup that fits within the moat, a plunger sized to fit within the neck of the jar and having a keyed handle that extends up through the slot in the lid, and a compression spring. The lid moat and inverted cup comprise an airlock or one way valve that allows fermentation gases to escape but prevents outside air from entering. The screw lid, spring and plunger comprise a press that compresses the fermenting vegetables to press juice from the vegetables and to hold the vegetables under the liquid surface to prevent mold or other spoilage and to prevent browning.

11 Claims, 3 Drawing Sheets

VEGETABLE FERMENTING KITCHENWARE

This application claims benefit of provisional application 61/796,028, filed Nov. 1, 2012.

BACKGROUND OF THE INVENTION

This invention relates to kitchenware that is used in the production of fermented vegetable foods such as sauerkraut, pickles, and kimchi. Throughout this specification, the vegetable fermenting kitchenware will for convenience be referred to as a sauerkraut maker.

Prior art for devices used to ferment vegetable foods includes two designs currently being commercially produced and sold.

Fermenting crock pots comprise an open top ceramic pot with a round moat around the top opening, an inverted cup shaped cap that fits within the moat, and a weight (a glass "hockey puck" or rock) sized to fit within the pot center opening. To make sauerkraut, for example, cabbage is cut up, salted, and packed down into the pot. The weight is placed on top of the vegetables. Juice is drawn from the cabbage by a combination of osmosis and compression. If the drawn juice does not, by itself, cover the cabbage, water or brine is added. The crock moat is filled with water, and the cup shaped cap is placed in the moat to produce an airtight seal that allows gas to escape, bubbling through the water, but without allowing air to enter. The cabbage and liquid begin to ferment through the action of lactic acid-producing bacteria. The weight remains in the crock to keep the cabbage submerged. The cabbage and liquid ferment for a number of days, producing sauerkraut.

A disadvantage of fermenting crocks is that the weight or rock, due to practical size limitations, is typically not heavy enough to adequately compress the cabbage so that added weight must be piled on top. Another disadvantage is that, after fermentation is complete, the sauerkraut usually must be transferred to a secondary container for storage. Also, unless made of clear glass, the crock is opaque and the fermentation process cannot be observed.

A second type of sauerkraut maker comprises a glass Mason jar with a modified lid having a small central opening into which is fitted a siphon-like airlock. When fermentation is complete, the airlock cap is replaced with an ordinary jar top and the sauerkraut is ready for storage. A problem with the siphon airlock is that, when the fermenting material grows in volume due to the production of carbon dioxide, the small opening can become blocked and the un-vented pressure can cause the jar to burst. This product provides no means for pressing juice from the cabbage nor for submerging the cabbage. The resulting sauerkraut is often of inferior quality and un-submerged material is subject to attack by mold and other undesirable microorganisms.

Deficiencies of currently available systems are highlighted in the best selling book "Cooked: A Natural History of Transformation", Michael Pollan, copyright 2013, published by the Penguin Group:

"The man who taught me to make sauerkraut is . . . possibly the most famous fermento (sic) in America. Sandor Katz . . . "

"My first expedition into the wilds of the post-Pasteurian world came last summer, when I tested a few of Sandor Katz's pickling recipes at home. I decided to begin my education with vegetable ferments because they seemed the easiest and, which is important, the safest. No less an authority than Steinkraus had written that the safety record of fermented vegetables was very good even when "the foods are manufactured by people without training in microbiology or chemistry in unhygienic, contaminated environments." (That would be me.) One USDA scientist went so far as to claim that there had never been a documented case of food-borne illness from eating fermented vegetables.

"Suitably reassured, I bought a case of quart sized Mason jars at the hardware store . . . I also ordered online a 7.5-liter German sauerkraut crock. The perimeter of this ceramic crock has a deep circular well into which the lid fits; filling this moat with an inch or two of water creates an airlock that prevents oxygen from getting in while allowing the carbon dioxide emitted during fermentation to bubble out. Note: I discovered when it arrived that 7.5 liters is a much bigger crock than anyone needs, unless you're planning to feed a small German village . . . "

"Katz said the vegetables should be completely submerged, but invariably some insist on floating to the top, exposing themselves to oxygen—and the possibility of rot. I tried a variety of tricks to force them back underwater, including a saucer, some Ping-Pong balls, a plastic bag filled with pebbles, and some weighted grape leaves." (end quote)

What is needed is a vegetable fermentation system that is light in weight, easy to use, adequately compresses the vegetables, holds the vegetables submerged during fermentation, provides a safe one-way valve that allows gases to escape but not enter, and is convenient for storage.

Accordingly, several advantages of some aspects of the invention are:

(a) to provide a sauerkraut maker that is easy to use;
(b) to provide a sauerkraut maker that produces a superior product;
(c) to provide a sauerkraut maker that compresses the vegetables firmly enough to effectively press out the juice;
(d) to provide a sauerkraut maker that keeps the vegetables submerged during fermentation;
(e) to provide a sauerkraut maker that safely maintains an anaerobic environment by releasing carbon dioxide while preventing the entry of oxygen;
(f) to provide a sauerkraut maker that is durable;
(g) to provide a sauerkraut maker that is easy to clean;
(h) to provide a sauerkraut maker that uses standard Mason jars suitable for storage;
(i) to provide a sauerkraut maker that is inexpensive to manufacture using a combination of off-the-shelf and easily fabricated parts;
(j) to provide a sauerkraut maker that can be manufactured from plastic, stainless steel, or glass;
(k) to provide a sauerkraut maker that requires no fasteners or adhesive and minimal assembly labor;
(l) to provide a sauerkraut maker that can be used to produce a variety of fermented foods such as yogurt (room temperature), kefir, hard cider, etc;
(m) to provide a sauerkraut maker that utilizes a lightweight mechanical press rather than a heavy gravity press.

SUMMARY OF THE INVENTION

A kitchenware apparatus and container for producing fermented foods, such as sauerkraut, comprises a screw top jar or Mason jar, a threaded jar ring or threaded lid, a water moat, an inverted cup shaped cap ("cup") that fits within the moat, and a mechanical press sized to fit within the neck of the jar. The jar lid and moat may be separate or integral. The spring press comprises a plunger that is pressed downward by a spring, the spring at its upper end pressing against the moat or lid bottom. The moat may incorporate an oblong top opening or slot, and the press may have a keyed handle that extends up through the moat slot allowing the spring to be fixed in a compressed position for convenience when screwing down the ring or threaded lid or cap.

To make sauerkraut, salted shredded cabbage is placed in the jar and tamped down until the compressed cabbage rises nearly to the jar top. A top assembly is formed from the screw top, the spring, and the plunger. After pulling up on the handle, the plunger is rotated 90°, across the slot so that the keyed handle engages the narrow sides of the slot, keeping the spring compressed. The lid is screwed on and the plunger is then rotated 90° to free it from its engagement. The plunger is forced downward by the action of the spring and further compresses the cabbage. Over the next day or two, compression and osmosis draw juice from the cabbage. If the drawn juice does not, by itself, cover the cabbage, water is added. The top moat is filled with water, and the cap is placed in the moat to produce an airtight seal that allows gas to escape but not enter. The cabbage and liquid begin to ferment through the action of naturally occurring lactobacillus nourished by nutrients in the cabbage brine. The plunger remains in the lowered position keeping the cabbage submerged. The cabbage and liquid ferment for a number of days, until the buildup of lactic acid inhibits further bacterial growth. The sauerkraut is then ready. The moat top is replaced with an ordinary Mason lid and screwed on to the jar. The sauerkraut may be eaten immediately or stored in a cool (below 60° F.) location for later consumption.

Fermented foods are produced worldwide using a variety of ingredients and recipes. German sauerkraut, Korean kimchi, and pickles are well known. In East Asia alone a wide variety of brine fermented vegetable foods are produced, including: bossam-kimchi, chonggak-kimchi, dan moogi, dongchimi, kachdoo kigactuki, kakduggi, kimchi, mootsanji, muchung-kimchi, oigee, oiji, oiso baegi, tongbaechu-kimchi, tongkimchi, and totkal kimchi.

Sauerkraut is made by the process of pickling called lacto-fermentation, specifically brine fermentation, that is analogous to how many traditional (not heat-treated) pickled cucumbers and kimchi are made. Fully cured sauerkraut keeps for several months in an airtight container stored at or below 60° F. Neither refrigeration nor pasteurization is required. Fermentation by lactobacilli is usually introduced naturally, as these bacteria culture on raw cabbage leaves where they grow, though starter cultures are sometimes used. The action of lactobacilli in fermented vegetables enhances their digestibility and increases vitamin levels. These bacteria produce beneficial digestive enzymes, generate antibiotic and anti-carcinogenic substances, and eliminate certain anti-nutrients. Their main by-product, lactic acid, preserves vegetables and fruits and also promotes the growth of healthy flora in the intestine.

Other anaerobic fermented foods that may be produced using this invention include room-temperature yogurt, kefir, hard cider, and others. These and other objects, advantages and features of the invention will be apparent from the following description of a preferred embodiment, considered along with the accompanying drawings.

DESCRIPTION OF THE DRAWINGS

FIGS. 1a-2d illustrate a first embodiment of a sauerkraut maker of the invention.

FIG. 1a is a perspective view of the assembled first embodiment.

FIG. 2d is a bottom perspective view of the spring driven press of the first embodiment.

FIG. 3a is a perspective view of the assembled second embodiment.

FIG. 3b is a perspective view of the partially disassembled second embodiment.

FIG. 3c is a perspective view of the disassembled second embodiment spring press and moat lid.

FIG. 3d is a bottom perspective view of the second embodiment moat lid.

DESCRIPTION OF FIRST EMBODIMENT

This embodiment is suitable for manufacture using injection molded plastic, although metal components can be used, such as stainless steel.

Figure 1A:
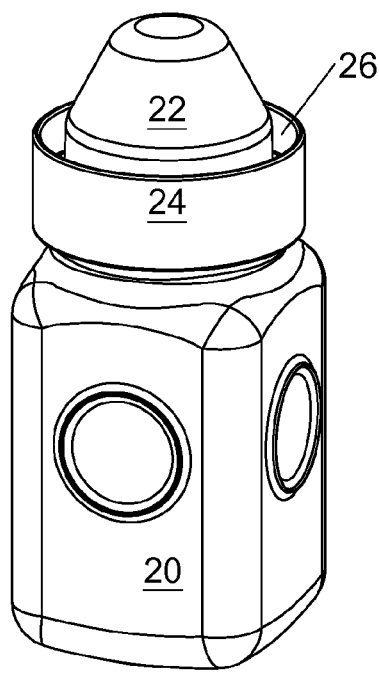

FIG. 1a is a perspective view of an assembled sauerkraut maker. A closed end hollow tapered cylindrical inverted cup 22 rests within a moat 26 atop a cylindrical lid or cap 24 threaded onto a jar 20.

Figure 1B:
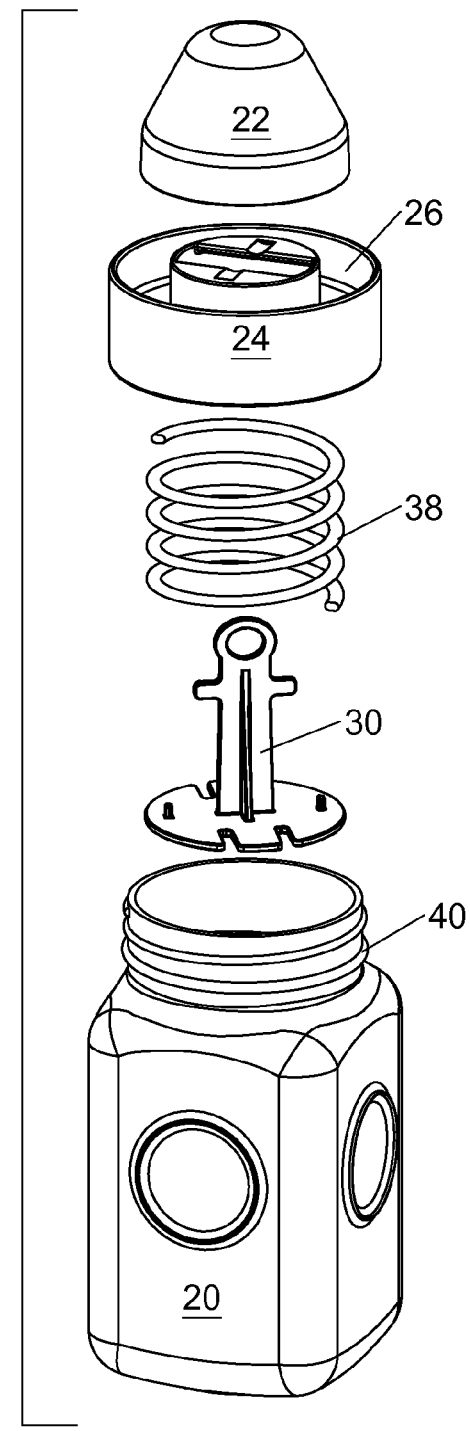
FIG. 1b is a perspective view of the disassembled first embodiment.

FIG. 1b is a perspective view of a disassembled sauerkraut maker. A plunger 30 and a spring 38 are sized to fit within the jar mouth. A set of jar neck threads 40 that engage threads (not visible) in the lid or cap 24 are shown. The plunger, spring, and threaded lid form the elements of a spring press and will be treated in detail in FIGS. 2a-2d.

Figure 2A:
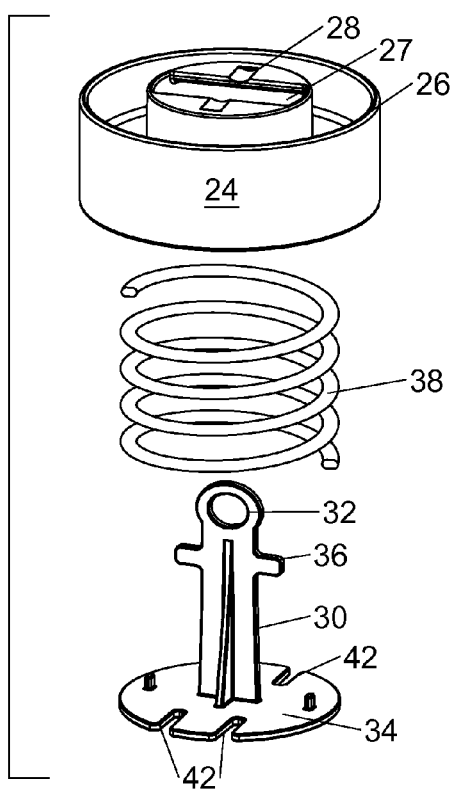
FIG. 2a is a detail view of a disassembled spring driven press and moat lid of the first embodiment.

FIG. 2a is a detail view of the plunger, spring, and threaded lid. The plunger 30 comprises a base or base plate 34 pierced by a set of slots 42, a plunger handle 32, and a plunger key 36. Visible features of the lid 24 include a rest or catch 28, an open slot 27, and moat 26, an annular trough formed in the lid. The base plate 34 is of a size to substantially extend across the jar's interior, to the extent that it is capable of pressing and holding down a mass of shredded vegetable material.

Figure 2B:
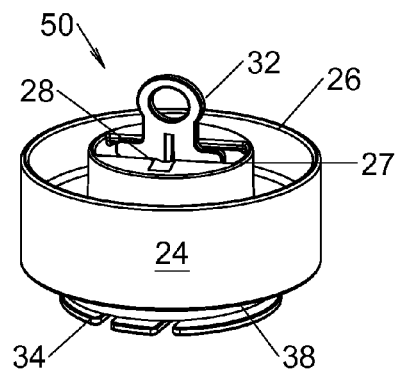
FIG. 2b is a perspective view of the partially compressed spring driven press of the first embodiment.

FIG. 2b is a view of the spring press assembly 50 during assembly, being comprised of plunger, spring, and threaded lid or cap. The plunger handle 32 is extending through the slot 27. The plunger base plate 34 and spring 38 are visible beneath the lid 24. The spring is partially compressed in FIG. 2b.

Figure 2C:
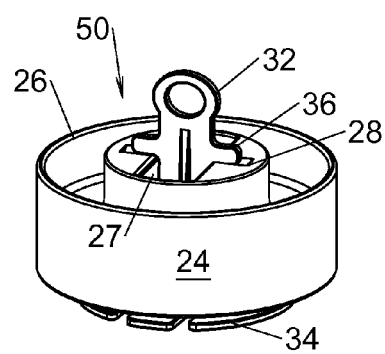
FIG. 2c is a perspective view of the completely compressed and locked spring driven press of the first embodiment.

FIG. 2c is an assembled view of a spring press with the spring (not visible) fully compressed. The plunger key 36 rests in the catch 28. The key and catch hold the spring completely compressed.

Figure 2D:
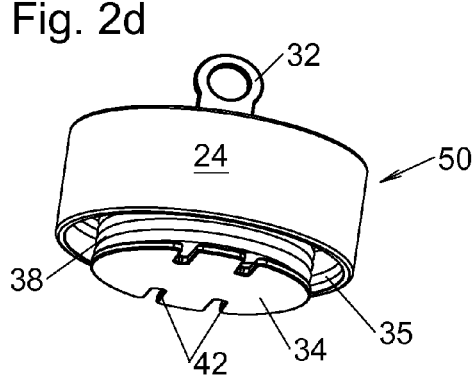

FIG. 2d is a bottom view of the spring press assembly 50. A set of threads 35, used to attach the lid to the jar and all four slots 42 are visible. The slots 42 help facilitate flow of liquid up through and around the base plate 34.

In this embodiment, the lid, airlock cap, and plunger are designed to be injection molded from food grade plastic such as PET. Springs formed from plastic or stainless steel and Mason jars are available from a variety of vendors. Other food grade materials could be used for the lid, cup and plunger. The spring could be several leaf springs extending down from the lid bottom, rather than the compression coil spring shown.

DESCRIPTION OF SECOND EMBODIMENT

This embodiment is primarily suitable for manufacture from stainless steel.

Figure 3A:
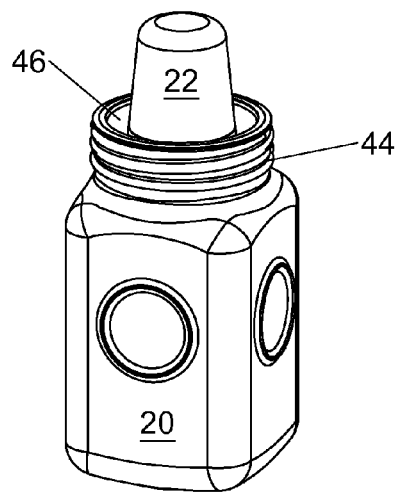
FIGS. 3a-3d illustrate a second embodiment of a sauerkraut maker.

FIG. 3a is a perspective view of a second embodiment of an assembled sauerkraut maker. A closed end hollow tapered cylindrical cup 22 rests within a moat-lid 46. The moat lid 46 is secured with a ring 44 threaded onto a jar 20. The jar 20, as in the first embodiment, preferably is of transparent material, and preferably glass.

Figure 3B:
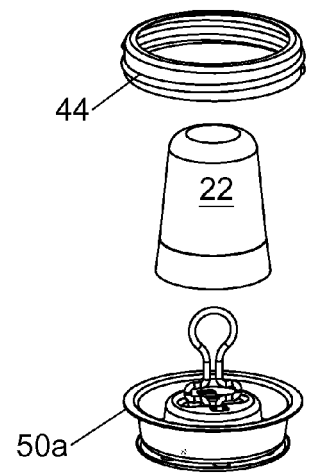

FIG. 3b is a perspective view of the partially disassembled sauerkraut maker. A spring press 50a is shown disassembled from the jar 20, ring 44, and cup 22. The jar 20 and ring 44 preferably are standard Mason jar components. The spring press 50a and cap 22 replace the standard flat Mason jar lid.

Figure 3C:
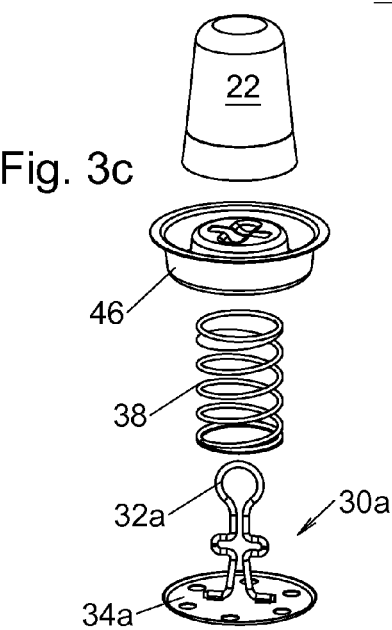

FIG. 3c is a perspective view of the disassembled spring press. The moat lid 46 assembles with a spring 38 and a plunger assembly 30a formed from a wire handle 32a and a plunger base plate 34a, shown with holes through the plate.

Figure 3D:
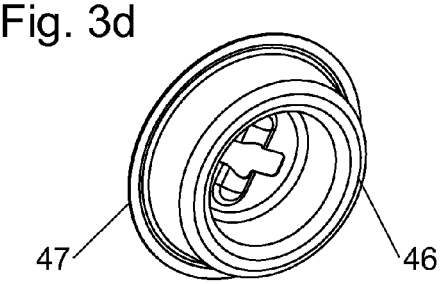

FIG. 3d is a bottom perspective view of the moat lid 46 showing the location of a washer or gasket 47. The washer creates a seal between the underside of the lid and the jar rim, as on a typical Mason jar. The washer may be a separate part or may comprise a layer of rubber or other resilient material sprayed or stamped onto the lid.

In this embodiment, the spring, moat-lid, cup, and plunger are designed to be formed from food grade metal such as 316 stainless steel (although other materials could be used). The lid, cup, and plunger base are stamped or drawn from sheet metal. The plunger handle and spring may be formed from metal wire. The Mason jar and ring are standard items.

This embodiment is preferred to the first embodiment as being formed from metal and being more compact. Many prefer stainless steel over plastic for food preparation purposes.

The capability of locking the press in the up position using the keyed handle and moat slot and rest is optional though it makes operation of the device much more convenient. Without the press lock, as with the compression spring 38 fixed to the bottom of the moat-lid 46, the user must push down firmly on the ring while screwing it onto the jar. However, this is less of a hindrance with the second embodiment, since the moat-lid 46 with its rim will tend not to rotate as the threaded ring 44 is turned.

Operation

To operate the sauerkraut maker, pack salted shredded cabbage (and any other ingredients such as spices, other vegetables, etc. called for by the recipe) into the jar. Compress the spring with the plunger handle extending through the top slot. Twist the handle 90° such that the plunger key engages the catch in the lid thus holding the spring compressed. Screw the spring press assembly onto the jar then twist the plunger handle 90°, freeing the plunger to press down on the cabbage mixture.

Open slots or holes in the plunger base allow liquid to rise but are narrow enough that solids are held below. After a day or two, juice has been drawn from the cabbage through pressure and osmosis. If necessary, add water to the jar so that the cabbage is completely submerged, but keep the fluid level below the jar top as the mixture expands due to carbon dioxide bubbles formed during fermentation. Fill the moat in the lid with water and set the cup into the moat, open side down, forming an airlock or one way valve. The cabbage and brine ferment over the course of 2-4 weeks. Replace water in the moat if necessary to replace water lost to evaporation. Bubbles of carbon dioxide are formed and the cap "burps" to relieve pressure. The sauerkraut is finished when it stops bubbling. Another sign that the sauerkraut is ready is that the liquid, cloudy during fermentation, becomes clear. The spring press assembly is removed and the ordinary ring and top is screwed onto the jar. The sauerkraut may be eaten immediately or stored at a temperature less than 60° F. for up to 6 months. If refrigerated below 35° F. the sauerkraut may safely be stored for a much longer period without spoiling.

Classic Sauerkraut Recipe

Ingredients:

1¼ pounds green cabbage, finely shredded this is cut weight)

1 tablespoon Celtic sea salt 2 teaspoons whole caraway seeds

Filtered water as necessary (filtered to remove chlorine/chloramine and fluoride)

1 quart-size wide-mouth Mason jar

Method:

1. Finely shred the cabbage using a grater or cut by hand with a knife.

2. Place in a large stainless steel or glass mixing bowl, and massage the sea salt into the cabbage. Don't be timid. Give your shredded cabbage some good squeezes.

3. Allow the massaged vegetable to rest in the bowl for about 30 minutes so that the salt can draw out water from the cabbage.

4. After resting, add in the caraway seeds and mix well.

5. Fill the Mason jar with the seasoned cabbage. Be sure to include the liquid that has leached out.

6. Using the end of a rolling pin, gently but firmly pound the cabbage into the jar. Keep pressing until the top of the cabbage is at about 1.5"-2" below the very top rim of the jar.

7. Secure the kraut-maker spring onto the kraut-maker press, and place it into the Mason jar on top of the cabbage.

8. Screw the moat securely onto the Mason jar.

9. Fill the moat with water up to within ¼" of the rim.

10. Place the cap into the moat.

Notes:

a. It is really important to keep the cabbage submerged under at least 1" of liquid. If your cabbage does not release enough water, then add additional salted filtered water as needed. (The ratio for water to salt=1 cup:1 Teaspoon salt.)

b. Sometimes the cabbage may release enough carbon dioxide to overflow, so keep an eye on your fermentation, especially during the first 12 hours.

c. Do not use plastic, or mixed metals to ferment, as the salt brine will leach chemicals into your sauerkraut.

d. To get the most benefit from your lacto-fermented vegetables, do not heat them up.

e. Enjoy sauerkraut and other fermented vegetables as condiments. So, best to have about ⅓ cup with your meals.

f. The brine is also beneficial. When you have a stomach ache or indigestion, drink about an ounce to feel better.

Although the description above contains many specifies, these should not be construed as limiting the scope of the invention but as merely providing illustrations of some of the presently preferred embodiments of the invention.

For example, to create greater compression force, the spring press could utilize two or more coil springs arranged concentrically, side by side, etc.

The coil spring could replaced by another spring shape such as a cantilever leaf spring, dual cantilever, multi cantilever, or other type.

Other possible configurations of the spring press assembly are possible. The spring could bear against the plunger at a point above the base plate. Rather than a separate unit, the spring could be integrated into the screw lid or plunger. The entire spring press (top, spring, and plunger) could be formed as a single integral unit, permanently secured together. The plunger might have no handle. The moat lid might attach to the jar using an interference fit rather than threads. The moat or cup might be shaped differently. Rather than cup shaped, the cup could have some other regular or decorative shape such as that of a cabbage, artichoke, etc. It could be ceramic. Other decorative elements could be added. The airlock could be of a different type, such as a cylindrical plastic water-containing airlock with an internal inverted cup, as in the typical device used in home beer fermentation, and with the bottom tubular stem of the device fitting into the lid. The mechanical press/plunger could be a fixed disc depending from the lid, without a spring. It could be of glass or another inert material.

These summarized alternate embodiments are not preferred and so were not expanded upon in the description.

The above described preferred embodiments are intended to illustrate the principles of the invention, but not to limit its scope. Other embodiments and variations to this embodiment will be apparent to those skilled in the art and may be made without departing from the spirit and scope of the invention as defined in the following claims and their legal equivalents.

We claim:

1. A device for fermenting vegetable foods, comprising:
   a jar having an open top with a neck,
   a cap fitted to the neck of the jar so as to be attachable to the jar neck in sealed relationship, and with an airlock to allow escape of gases from the jar when the cap is in place but not to allow entry of air into the jar,
   a plunger below the cap, including a horizontal plunger base plate, configured to substantially span across the jar internally so as to be capable of pressing down and holding down a mass of vegetable foods within the jar, and
   a compression spring between the cap and the plunger base plate, the compression spring being configured and positioned to engage against a bottom of the cap and to press down on the plunger so that the plunger base plate is pressed downwardly when the cap is secured on the jar and a mass of vegetable foods is contained in the jar.

2. The device of claim 1, wherein the plunger includes a plunger handle extending upwardly from the plunger base plate, the compression spring being a coil spring encircling the plunger handle when the cap is on the jar, and the upper end of the handle formed into a key to fit through a slot in the center of the cap so that the plunger handle can be pushed up through the slot of the cap against the force of the spring to compress the spring, then turned so that the key crosses the slot and retains the compression spring compressed between the plunger base plate and the cap.

3. The device of claim 2, wherein the airlock comprises an annular moat formed in the top of the cap to retain water, and an inverted cup to rest in water contained in the moat.

4. The device of claim 3, wherein the key comprises a pair of key arms extending laterally from the plunger handle, and the slot in the cap is of a length sufficient for the plunger handle with arms to pass through.

5. The device of claim 1, wherein the airlock comprises an annular moat formed in the top of the cap to retain water, and an inverted cup to rest in water contained in the moat.

6. The device of claim 1, wherein the cap is internally threaded, the jar having a complementarily threaded neck, so that the cap is attached by screwing the cap down onto the jar neck.

7. The device of claim 6, wherein the cap comprises two components, a main component of diameter to extend across the open top of the jar and having an annular rim of diameter to engage down against the top of the jar neck, and a separate threaded ring to engage the threads of the jar neck and to press down against the rim to firmly engage the rim against the jar neck when the threaded ring is fully threaded down onto the jar.

8. A device for fermenting vegetable foods, comprising:
   a jar having an open top with a neck,
   a lid fitted to the neck of the jar so as to be attachable to the jar neck in sealed relationship, and with an airlock to allow escape of gases from the jar when the lid is in place but not to allow entry of air into the jar,
   a mechanical press below the lid including a base positioned to press down on a mass of vegetable material contained in the jar when the lid is secured on the jar.

9. The device of claim 8, wherein the jar is of transparent glass.

10. The device of claim 8, wherein the mechanical press includes a compression coil spring which acts between the lid and the base to push the base downwardly, pressing a mass of vegetable material when contained in the jar.

11. The device of claim 8, wherein the lid comprises two components, a main component of diameter to extend across the open top of the jar and having an annular rim of diameter to engage down against the top of the jar neck, and a separate threaded ring to engage the threads of the jar neck, and to press down against to firmly engage the rim against the jar neck when the threaded ring is fully threaded down onto the jar.

* * * * *